(12) United States Patent
Zhang et al.

(10) Patent No.: US 11,049,282 B2
(45) Date of Patent: Jun. 29, 2021

(54) VISION CALIBRATION SYSTEM FOR ROBOTIC CARTON UNLOADING

(71) Applicant: Intelligrated Headquarters, LLC, Mason, OH (US)

(72) Inventors: Feng Zhang, St. Louis, MO (US); Sriram Pavan Tankasala, Willowbrook, IL (US)

(73) Assignee: Intelligrated Headquarters, LLC, Mason, OH (US)

( * ) Notice: Subject to any disclaimer, the term of this patent is extended or adjusted under 35 U.S.C. 154(b) by 204 days.

(21) Appl. No.: 16/288,953

(22) Filed: Feb. 28, 2019

(65) Prior Publication Data
US 2020/0276713 A1    Sep. 3, 2020

(51) Int. Cl.
| | | |
|---|---|---|
| G06T 7/30 | (2017.01) | |
| B65G 67/24 | (2006.01) | |
| B25J 9/16 | (2006.01) | |
| G06T 7/80 | (2017.01) | |
| B65G 1/137 | (2006.01) | |

(52) U.S. Cl.
CPC .............. G06T 7/85 (2017.01); B25J 9/1692 (2013.01); B25J 9/1697 (2013.01); B65G 67/24 (2013.01); G06T 7/30 (2017.01); B65G 1/1373 (2013.01); G06T 2207/10028 (2013.01)

(58) Field of Classification Search
CPC .................................. G06T 7/85; B65G 67/24
USPC ......................................................... 382/285
See application file for complete search history.

(56) References Cited

U.S. PATENT DOCUMENTS

| | | | |
|---|---|---|---|
| 8,264,504 B2 | 9/2012 | Naimark | |
| 8,269,848 B2 | 9/2012 | Kakinami | |
| 8,401,276 B1* | 3/2013 | Choe | G06T 7/30 |
| | | | 382/154 |
| 10,719,953 B1* | 7/2020 | Ye | G06T 7/73 |

(Continued)

FOREIGN PATENT DOCUMENTS

CN         206441237 U        8/2017

OTHER PUBLICATIONS

Aldoma et al., CAD-Model Recognition and 6DOF Pose Estimation Using 3D Cues, [2011] [retrieved on Aug. 10, 2020] retrieved from the Internet URL: https://ieeexplore.ieee.org/document/6130296, 8 pages.

(Continued)

Primary Examiner — Thomas Randazzo
(74) Attorney, Agent, or Firm — Alston & Bird LLP (57) ABSTRACT

The present disclosure relates to a method and system for calibrating a carton detection system. The method includes receiving a three-dimensional (3D) point cloud of a calibration object, determining a 3D target pose of the calibration object by comparing the 3D point cloud to a point cloud template, receiving a two-dimensional (2D) optical image of the calibration object, identifying one or more markers of the calibration object based on the 2D optical image, determining a marker pose for each of the one or more markers based on the 2D optical image, determining a 2D target pose based on the marker pose for each of the one or more markers, generating a transformation matrix based on the 3D target pose and the 2D target pose, and calibrating the carton detection system based on the transformation matrix.

18 Claims, 5 Drawing Sheets

(56) References Cited

U.S. PATENT DOCUMENTS

| | | | |
|---|---|---|---|
| 2010/0209013 A1* | 8/2010 | Minear | G06T 7/32 |
| | | | 382/260 |
| 2010/0232684 A1* | 9/2010 | Fujieda | G06T 7/85 |
| | | | 382/154 |
| 2012/0256916 A1* | 10/2012 | Kitamura | G01B 11/24 |
| | | | 345/419 |
| 2015/0360882 A1* | 12/2015 | Girtman | B25J 11/00 |
| | | | 700/213 |
| 2016/0214255 A1* | 7/2016 | Uhlenbrock | B25J 9/1697 |
| 2017/0316253 A1* | 11/2017 | Phillips | G06T 7/50 |
| 2018/0338742 A1* | 11/2018 | Singh | A61B 6/587 |
| 2018/0374239 A1* | 12/2018 | Wallack | H04N 13/246 |
| 2019/0073792 A1* | 3/2019 | Fletcher | G06T 7/73 |
| 2019/0080503 A1* | 3/2019 | Bhowmick | G06T 15/04 |
| 2019/0096092 A1* | 3/2019 | Zhou | G06T 7/37 |
| 2019/0116354 A1* | 4/2019 | Yao | G06T 7/75 |
| 2019/0130605 A1* | 5/2019 | Yu | G06T 7/55 |
| 2019/0139255 A1* | 5/2019 | Shih | H04N 5/2257 |
| 2019/0184570 A1* | 6/2019 | Yung | B25J 9/161 |
| 2019/0279399 A1* | 9/2019 | Yasunaga | G06T 7/85 |
| 2019/0385285 A1* | 12/2019 | Chen | G06T 5/006 |
| 2020/0007843 A1* | 1/2020 | Zhang | G06T 7/521 |
| 2020/0211205 A1* | 7/2020 | LeGaye | G06T 7/251 |
| 2020/0320740 A1* | 10/2020 | McGarry | G01B 11/2504 |

OTHER PUBLICATIONS

Extended European Search Report for Patent Application No. 20159166.6 dated Aug. 7, 2020, 8 pages.

Forbes et al., An Inexpensive, Automatic and Accurate Camera Calibration Method, [2002] [retrieved on Aug. 10, 2020] retrieved from the Internet URL: https://www.semanticscholar.org/paper/An-Inexpensive%2C-Automatic-and-Accurate-Camera-Forbes-Voigt/c4c5797e2eaa5ae29fe5aeca464571ea03991b81, 6 pages.

Communication pursuant to Rules 70(2) and 70a(2) for European Patent Application No. 20159166.6 dated Sep. 14, 2020, 2 pages.

* cited by examiner

VISION CALIBRATION SYSTEM FOR ROBOTIC CARTON UNLOADING

TECHNOLOGICAL FIELD

Example embodiments of the present invention relate generally to material handling systems and, more particularly, to machine vision systems.

BACKGROUND

In a high-volume distribution and fulfillment center, large truck shipments may be unloaded manually with human laborers, an operation that may be physically demanding and costly, or unloaded with the assistance of material handling systems. In assisted environments, due to the impact on the overall efficiency of a distribution center, the location, orientation, and/or position of material handling system components are controlled in order to avoid unloading errors. Applicant has identified several technical challenges associated with unloading systems and other associated systems and methods. Through applied effort, ingenuity, and innovation, many of these identified challenges have been overcome by developing solutions that are included in embodiments of the present invention, many examples of which are described in detail herein.

BRIEF SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

The embodiments of the present disclosure relate to systems and methods for unloading cartons in a material handling environment. According to at least one aspect of the present disclosure, a method of calibrating a carton detection system is provided. The method may include receiving a three-dimensional (3D) point cloud of a calibration object, determining a 3D target pose of the calibration object by comparing the 3D point cloud of the calibration object to a point cloud template, receiving a two-dimensional (2D) optical image of the calibration object, identifying one or more markers of the calibration object based on the 2D optical image of the calibration object, determining a marker pose for each of the one or more markers of the calibration object based on the 2D optical image, determining a 2D target pose based on the marker pose for each of the one or more markers of the calibration object, generating a transformation matrix based on the 3D target pose and the 2D target pose, and calibrating the carton detection system based on the transformation matrix.

According to one or more embodiments of the present disclosure, identifying the one or more markers of the calibration object may include detecting one or more edges and corners of the one or more markers from the 2D optical image.

According to one or more embodiments of the present disclosure, determining the marker pose for each of the one or more markers may include estimating the marker pose based on at least one of a camera focus and marker size.

According to one or more embodiments of the present disclosure, determining the 2D target pose based on the marker pose may further include determining a marker location for each of the one or more markers.

According to one or more embodiments of the present disclosure, generating the transformation matrix may include generating a rotation submatrix and a translation submatrix. The method may further include generating the rotation submatrix based on one or more of a roll angle, a pitch angle, and/or a yaw angle. According to one or more embodiments of the present disclosure, the method may further include generating the translation submatrix based on a translation between one or more of the 3D point cloud, the 2D optical image, and the point cloud template.

According to one or more embodiments of the present disclosure, generating the transformation matrix may further include generating a 3D_to_target transformation matrix based on the 3D target pose, generating a 2D_to_target transformation matrix based on the 2D target pose, and generating the transformation matrix based on the 3D_to_target transformation matrix and the 2D_to_target transformation matrix.

According to one or more embodiments of the present disclosure, calibrating the carton detection system may include projecting one or more points of the 3D point cloud on the 2D optical image based on the transformation matrix.

According to another aspect of the present disclosure, a robotic carton handling system for unloading cartons is provided. The robotic carton handling system may include a mobile body and a movable robotic manipulator attached to the mobile body. The movable robotic manipulator may include an end effector for unloading one or more cartons from the carton pile. The robotic carton handling system may further include a carton detection system including one or more sensors coupled respectively to one of the mobile body and the movable robotic manipulator to generate a two-dimensional (2D) optical image and a three-dimensional (3D) point cloud of a calibration object. The carton detection system may further include a processing subsystem in communication with the one or more sensors, the processing subsystem may receive the 3D point cloud of the calibration object from the one or more sensors, determine a 3D target pose of the calibration object by comparing the 3D point cloud of the calibration object to a point cloud template, receive the 2D optical image of the calibration object, identify one or more markers of the calibration object based on the 2D optical image of the calibration object, determine a marker pose for each of the one or more markers of the calibration object based on the 2D optical image, determine a 2D target pose based on the marker pose for each of the one or more markers of the calibration object, generate a transformation matrix based on the 3D target pose and the 2D target pose, and calibrate the carton detection system based on the transformation matrix.

According to one or more embodiments of the present disclosure, the one or more sensors may generate the 2D optical image and the 3D point cloud of an I-shaped target defining one or more markers.

According to one or more embodiments of the present disclosure, the one or more sensors may generate data related to a shape of the calibration object.

According to one or more embodiments of the present disclosure, the processing subsystem may further detect one or more edges and corners of the one or more markers from the 2D optical image.

According to one or more embodiments of the present disclosure, the processing subsystem may further estimate marker pose based on at least one of a camera focus and a marker size.

According to one or more embodiments of the present disclosure, the processing subsystem in generating the transformation matrix may generate a rotation submatrix and a translation submatrix.

According to one or more embodiments of the present disclosure, the processing subsystem may further generate a 3D_to_target transformation matrix based on the 3D target pose, generate a 2D_to_target transformation matrix based on the 2D target pose, and generate the transformation matrix based on the 3D_to_target transformation matrix and the 2D_to_target transformation matrix.

According to one or more embodiments of the present disclosure, the processing subsystem may further project one or more points of the 3D point cloud on the 2D optical image based on the transformation matrix.

According to another aspect of the present disclosure, a material handling system is provided. The material handling system may include a robotic carton handling system for unloading cartons in a carton pile. The robotic carton handling system may include a mobile body and a movable robotic manipulator attached to the mobile body. The movable robotic manipulator may include an end effector for unloading one or more cartons from the carton pile. The robotic carton handling system may include a calibration object. The robotic carton handling system may further include a carton detection system having one or more sensors coupled to at least one of the mobile body or the movable robotic manipulator to generate a two-dimensional (2D) optical image and a three-dimensional (3D) point cloud of a calibration object. The carton detection system may further include a processing subsystem in communication with the one or more sensors, the processing subsystem may receive the 3D point cloud of the calibration object from the one or more sensors, determine a 3D target pose of the calibration object by comparing the 3D point cloud of the calibration object to a point cloud template, receive the 2D optical image of the calibration object, identify one or more markers of the calibration object based on the 2D optical image of the calibration object, determine a marker pose for each of the one or more markers of the calibration object based on the 2D optical image, determine a 2D target pose based on the marker pose for each of the one or more markers of the calibration object, generate a transformation matrix based on the 3D target pose and the 2D target pose, and calibrate the carton detection system based on the transformation matrix.

According to one or more embodiments of the present disclosure, the calibration object may include an I-shaped target defining one or more markers.

According to one or more embodiments of the present disclosure, the one or more sensors may generate data related to a shape of the calibration object.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout. Furthermore, while described herein with reference to a robotic carton unloader in a material handling environment, the present disclosure contemplates that the calibration systems and techniques described herein may also be applicable to other vision systems.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. It will be apparent to those skilled in the art, however, that these concepts may be practiced without these specific details.

As described above, methods and systems for unloading large truck shipments play an important part in the overall efficiency of a high-volume distribution and fulfillment center. Conventional unloading systems may include a robotic arm and multiple sensors that operate as machine vision to guide the robotic arm. As described with reference to the embodiments herein, multi sensor object localization is an important aspect in robotic operations. One step in the process of localization using multiple sensors is registration of sensor data or data alignment. In an example truck unloader application, a vision system may use both a three-dimensional (3D) sensor and/or camera and a two-dimensional (2D) sensor and/or camera to detect carton and/or objects in a trailer. Calibration of the 3D sensor and/or camera and the 2D sensor and/or camera for sensor data alignment may also be needed, as failure to calibrate the sensors may result in tool collision and product damage.

While sensor data alignment plays a key role for reliable object localization in an unloading application, calibration of 3D and 2D sensor data for industrial scale robotic applications is a challenging task. Manual calibration of 3D and 2D sensor requires physical measurement of a change in distance (e.g., delta) between two sensors and/or cameras. Further, the measurement of an offset between cameras, camera angle, and/or focus of 3D and 2D cameras may be challenging and/or inaccurate. In order to address these challenges and others, the calibration method and system of the present disclosure describe a custom calibration object and a transformation matrix for sensor data alignment. Conventional applications involve offline calibration of sensors with very complicated calibration process. In contrast, the proposed solution is cost effective with reliable results. The calibration object may also be easily shipped with the robot for onsite calibration.

Figure 1:
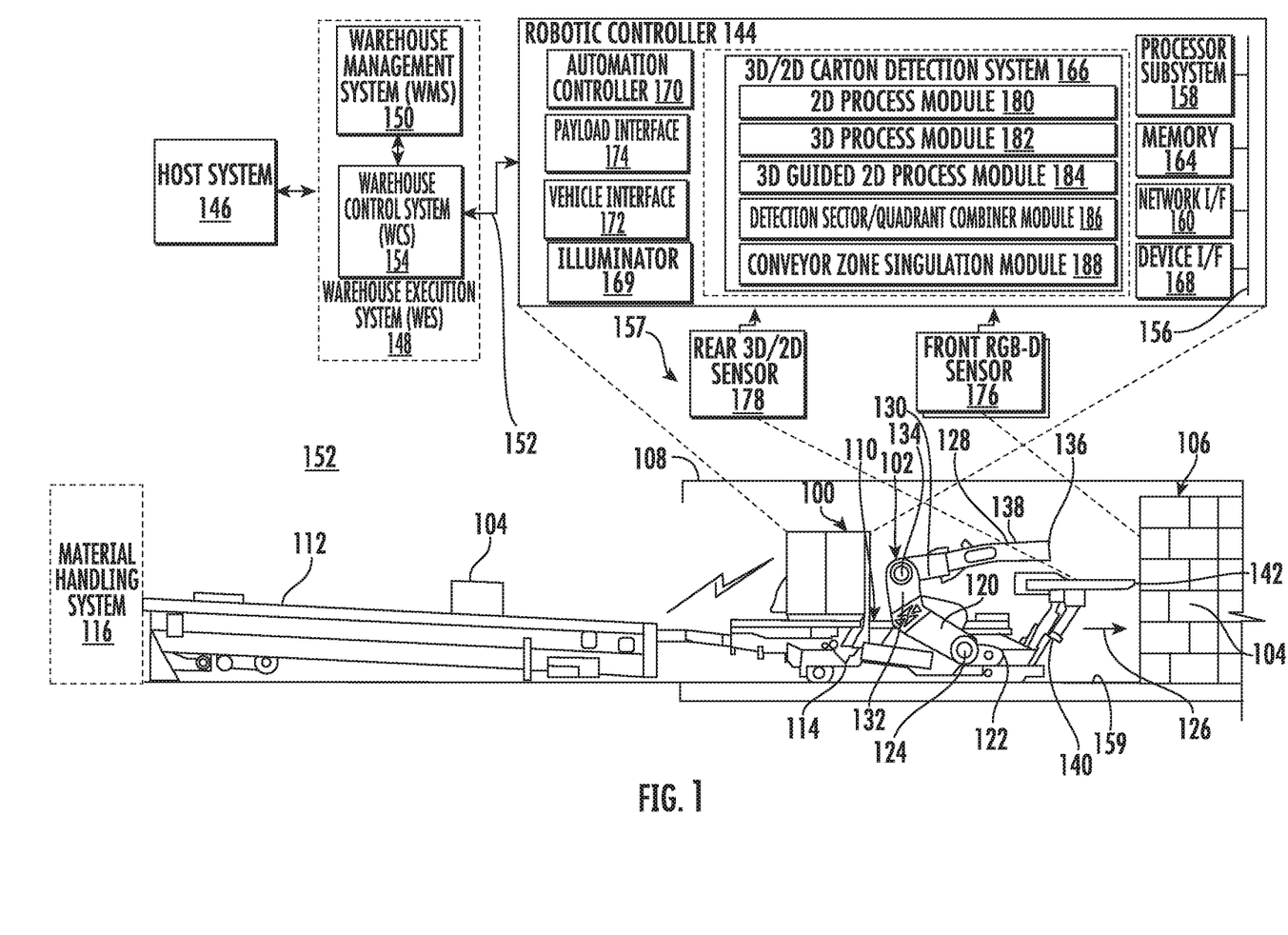
FIG. 1 illustrates a side view of a robotic carton handling system and functional block diagram, according to one or more embodiments.

FIG. 1 illustrates a perspective view of a robotic carton handling system 100 with a functional block diagram, in accordance with one or more embodiments of the present disclosure. As shown, FIG. 1 illustrates the robotic carton handling system 100 having a manipulator such as a robotic arm assembly 102 (e.g., movable robotic manipulator) configured to unload cartons 104 from a carton pile 106 inside of a carton pile container 108 (e.g., a trailer, shipping container, storage unit, etc.). Robotic arm assembly 102 places the cartons 104 onto a conveyor system 110 of the robotic carton handling system 100 that conveys the cartons 104 to an extendable conveyor 112 that follows a mobile body 114 of the robotic carton handling system 100 into the carton pile container 108. The extendable conveyor 112 in turn conveys the cartons 104 to a material handling system 116 such as in a warehouse, store, distribution center, or the like.

In one or more embodiments, the robotic carton handling system 100 may autonomously unload a carton pile 106 resting on a floor 159 of the carton pile container 108. The mobile body 114 may be self-propelled and movable across the floor 159 from outside to the innermost portion of the carton pile container 108. A right lower arm and a left lower arm 120 of the robotic arm assembly 102 may be pivotally attached at lower ends 122, respectively, of the mobile body 114 on opposing lateral sides of the conveyor system 110 passing there between. The right and left lower arms 120 may rotate about a lower arm axis 124 that is perpendicular to a longitudinal axis 126 of the conveyor system 110. An upper arm assembly 128 of the robotic arm assembly 102 may include a rear end 130 pivotally attached at an upper end 132 respectively of the right and left lower arms 120 to pivotally rotate about an upper arm axis 134 that is perpendicular to the longitudinal axis 126 of the conveyor system 110 and parallel to the lower arm axis 124. A manipulator head (end effector) 136 is attached to a front end 138 of the upper arm assembly 128 and may be configured to engage at least one carton 104 from the carton pile 106 resting on the floor 159 for movement to the conveyor system 110. The pivotal and simultaneous mirror movement of the right and left lower arms 120 maintains the upper arm axis 134 at a relative height above the conveyor system 110 so as to enable the at least one carton 104 to be conveyed by the conveyor system 110 without being impeded by the robotic arm assembly 102 as soon as the manipulator head 136 is clear. In one or more embodiments, the robotic carton handling system 100 may include a lift 140 attached between the mobile body 114 and a front portion 142 of the conveyor system 110. The lift 140 may be configured to move the front portion 142 of the conveyor system 110 relative to the floor 159 to reduce spacing underneath the at least one carton 104 during movement from the carton pile 106 to the conveyor system 110. While described herein with reference to the robotic carton handling system 100, the present disclosure contemplates that the calibration techniques described herein may be applicable to robotic arm assemblies, unloading systems, etc. of any type or configuration.

A higher-level system may assign an autonomous robotic vehicle controller 144 of the robotic carton handling system 100 to a particular carton pile container 108 and may receive information regarding progress of loading/unloading as well as provide a channel for telecontrol. A human operator may also selectively intervene when confronted with an error in loading or unloading. The higher-level system may include a host system 146 that handles external order transactions that are to be carried out by the material handling system 116. Alternatively or in addition, a warehouse execution system (WES) 148 may provide vertical integration of a warehouse management system (WMS) 150 that performs order fulfillment, labor management, and/or inventory tracking for a facility 152 such as a distribution center. The WES 148 may include a vertically integrated warehouse control system (WCS) 154 that controls automation so as to carry out the order fulfillment and inventory movements requested by the WMS 150.

In one or more embodiments, once assigned by the WES 148 or manually enabled, the robotic carton handling system 100 may operate autonomously under control of a robotic vehicle controller 154 in: (i) moving into a carton pile container 108, (ii) performing one of loading or unloading the carton pile container 108, and (iii) moving out of the carton pile container 108. In order to navigate within the carton pile container 108 and to expeditiously handle cartons 104 therein, a carton detection system 166 of the robotic vehicle controller 154 may include sensors 157 attached respectively to one of the mobile body 114 and the movable robotic manipulator (e.g., robotic arm assembly 102) to provide a two-dimensional (2D) optical image and a three-dimensional (3D) point cloud of at least one position of the carton pile 106 resting on the floor 159 of a carton pile container 108. The carton pile container 108 may be stationery or mobile, such as transportation carriers for highway, railway or shipping on navigable waters.

A controller 144 provides an environment within which one or more of the described features of the various embodiments of the disclosure may be implemented. The example controller 144 may be implemented as a unitary device or as a distributed processing system. The controller 144 may include functional components that communicate across a system interconnect of one or more conductors or fiber optic fabric that. For the sake of clarity and convenience of description, these example system interconnects are depicted as a system bus 156. The system bus 156 may include a data bus, address bus, and control bus for communicating data, addresses, and control information between any of these coupled units. Functional components of the controller 144 may include a processor subsystem 158 consisting of one or more central processing units (CPUs), digital signal processors (DSPs) and processor memory. The processor subsystem 158 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes including control of automation equipment of a material handling system.

In accordance with various aspects of the disclosure, an element, or any portion of an element, or any combination of elements may be implemented with processor subsystem 158 that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to affect a result is a processing system which is configured to perform tasks causing the result, such as by providing instructions to one or more components of the processing system which would cause those components to perform acts which, either on their own or in combination with other acts performed by other components of the processing system would cause the result.

The controller 144 may include a network interface (I/F) device 160 that enables the controller 144 to communicate or interface with other devices, services, and components that are located external to the controller 144, such as the WES 148. These networked devices, services, and components may interface with the controller 144 via an external network, such as example network 162, using one or more communication protocols. The network 162 may be a local area network, wide area network, personal area network, and the like, and the connection to and/or between the network 162 and the controller 144 may be wired, wireless, or a combination thereof. For the sake of clarity and convenience of description, the network 162 is indicated as a single collective component. However, it is appreciated that the network 162 may comprise one or more direct connections to other devices as well as a more complex set of interconnections as may exist within a wide area network, such as the Internet or on a private intranet. For example, a programming workstation may remotely modify programming or parameter settings of the controller 144 over the network 162. Various links in the network 162 may wired or wireless. The controller 144 may communicate via a device interface 168 with a number of onboard devices such as lights, indicators, manual controls, etc. A device interface 168 may include wireless links and wired links. For example, the controller 144 may direct the extendable conveyor 112 to follow the robotic carton handling system 100 into the carton pile container 108 or to lead the robotic carton handling system 100 out of the carton pile container 108.

The controller 144 may include several distributed subsystems that manage particular functions of the robotic carton handling system 100. An automation controller 170 may receive location and spatial calibration information from the carton detection system 166 and use this data to coordinate movement of the mobile body 114 via a vehicle interface 172 and movement by payload components such as the robotic arm assembly 102 and the lift 140 that moves the front portion 142 of the conveyor system 110.

The carton detection system 166 may include depth sensing using binocular principles, lidar principles, radar principles, and/or sonar principles. To avoid dependency on consistent ambient lighting conditions, an illuminator 169 may provide a consistent or adjustable amount of illumination in one or more spectrum bandwidths such as visual light or infrared. The illumination may be narrowly defined in the visual spectrum enabling filtration of most of the ambient light. Alternatively, the illumination may be outside of the visual range such that the illumination is not distracting to human operators. The carton detection system 166 may receive 2D and 3D sensor data from front 3D/2D sensors 176 that view an interior of the carton pile container 108 and the carton pile 106. The carton detection system 166 may receive 2D and 3D sensor data from front RGB-D sensors that view an interior of the carton pile container 108 and the carton pile 106. For these and other purposes, the carton detection system 166 may include various applications or components that perform processes described hereafter.

A system memory 164 may be used by the processor subsystem 158 for holding functional components such as data and software (e.g., the carton detection system 166). Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, function block diagram (FBD), ladder diagram (LD), structured text (ST), instruction list (IL), and sequential function chart (SFC) or otherwise. The software may reside on a computer-readable medium. For clarity, system memory 164 may include both random access memory, which may or may not be volatile, nonvolatile data storage. System memory 164 may contain one or more types of computer-readable medium, which can be a non-transitory or transitory. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, and/or distributed across multiple entities including the processing system. The computer-readable medium may be embodied in a computer-program product. By way of example, a computer-program product may include a computer-readable medium in packaging materials. As would be evident to one of ordinary skill in the art in light of the present disclosure, implementation of the functionality described herein may be adjusted based upon on the particular application and the overall design constraints imposed on the overall system.

Figure 2:
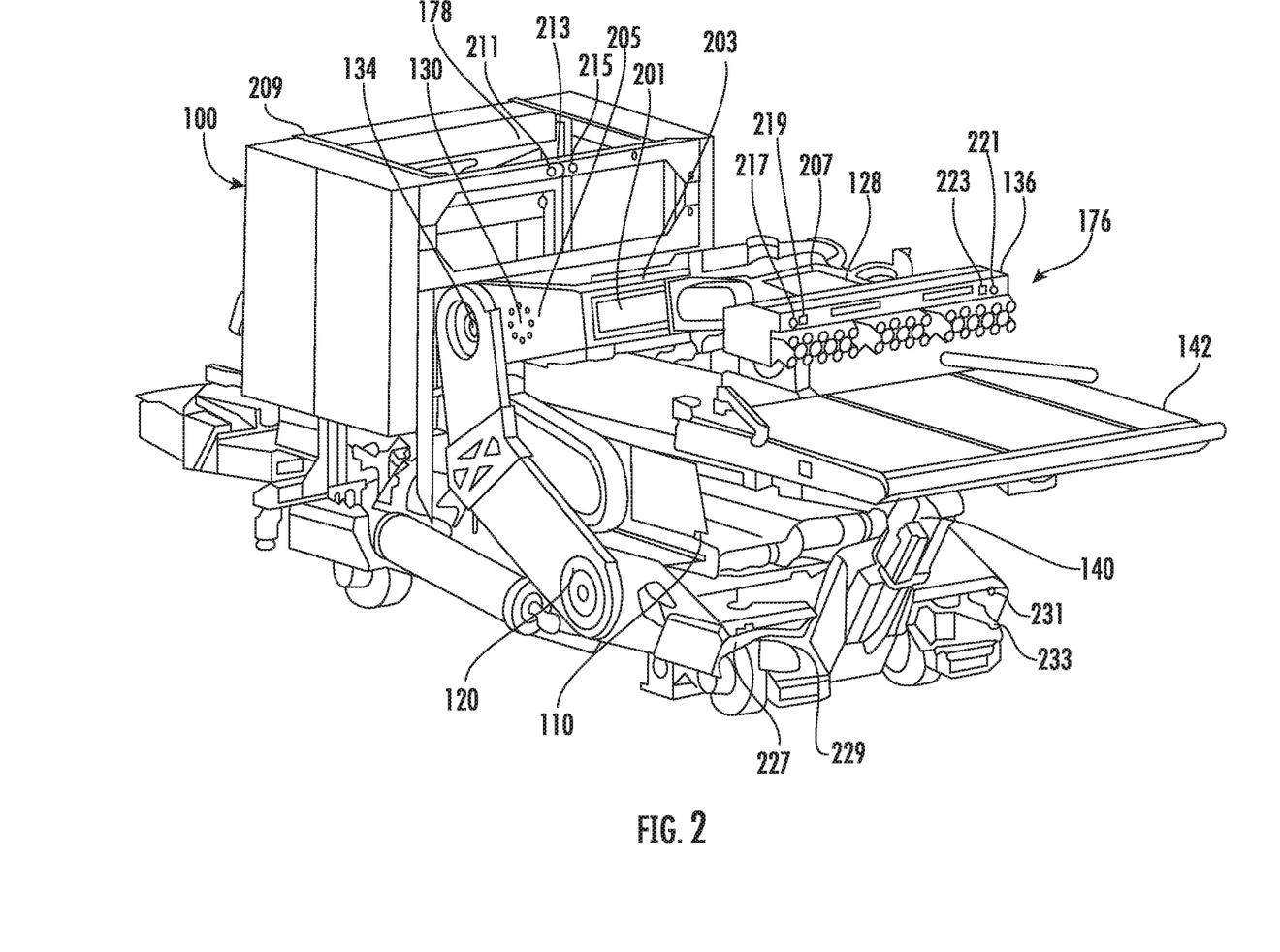
FIG. 2 illustrates a top isometric view of the robotic carton handling system of FIG. 1, according to one or more embodiments.

FIG. 2 illustrates an isometric view of the robotic carton handling system 100 of FIG. 1, according to one or more embodiments. As shown in FIG. 2, the upper arm assembly 128 of the robotic carton handling system 100 may include a rotatable gantry 201 having a rear end 130 pivotally attached at an upper arm axis 134 to the left and right lower arms 120. The rotatable gantry 201 defines a lateral guide 203 at an extended end 205. The upper arm assembly 128 may include an end arm 207 proximally attached for lateral movement to the lateral guide 203 of the rotatable gantry 201 and distally attached to the manipulator head 136. The end arm 207 may laterally translate so as to reach an increased lateral area. Thereby a lighter weight and more maneuverable manipulator head 136 can be employed.

In an embodiment, the carton detection system 166 may include rear 3D/2D sensors 178. The rear 3D/2D sensors 178 may include a 2D infrared sensor 211, a 3D depth sensor 213, and a 2D optical sensor 215. The front 3D/2D sensors 176 may include spatially separated sensors that operate in different spectrum and dimensions in order to detect articles such as product, cartons, boxes, cases, totes, etc., (cartons 104) under a number of stacking arrangements, lighting conditions, etc. Mounting sensors on the end effector (manipulator head 136) also allows varying a vantage point, such as looking downward onto the carton pile 106 to better differentiate top-most cartons 104. In an example embodiment, the front 3D/2D sensors 176 include a top left 2D sensor 217, a top left 3D sensor 219, a top right 2D sensor 221, and a top right 3D sensor 223 on the manipulator head 136. The front 3D/2D sensors 176 include bottom left 2D sensor 227, a bottom left 3D sensor 229, a bottom right 2D sensor 231, and a bottom right 3D sensor 233 on the front end of the mobile body 114.

Figure 3:
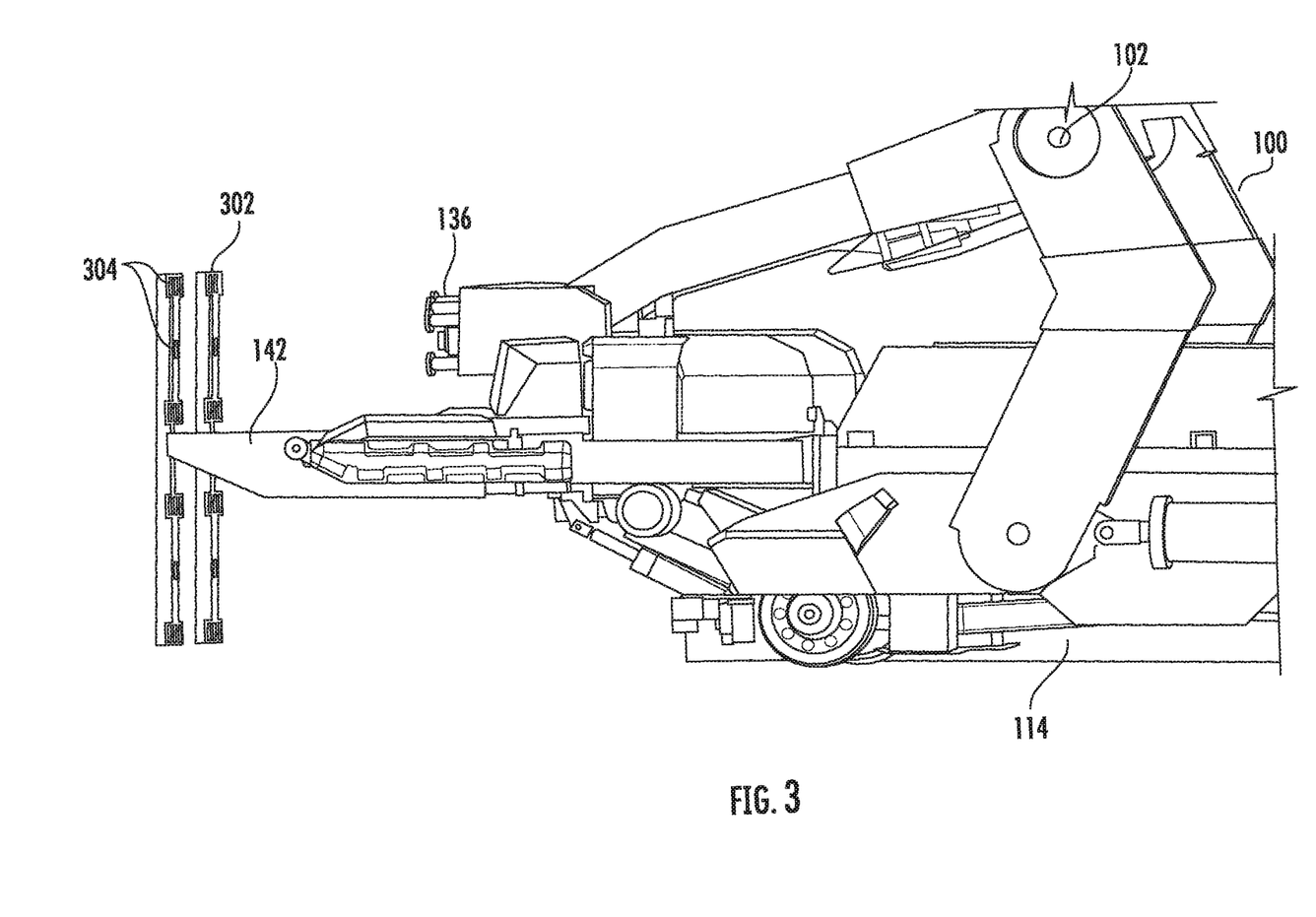
FIG. 3 illustrates a perspective view of a portion of the robotic carton handling system of FIG. 1 in accordance with one or more embodiments of the present disclosure.

FIG. 3 illustrates a perspective view of the robotic carton handling system 100 of FIG. 1 in accordance with one or more embodiments of the present disclosure. As shown in FIG. 3, the robotic carton handling system 100 may include the mobile body 114 and movable robotic manipulator 102. The movable robotic manipulator 102 may include the end effector 136, as shown. As described above, one or more 3D and/or 2D sensors (not shown) may be mounted on the end effector 136 and/or on the front end of the mobile body 114. The 3D and/or 2D sensors may provide sensor data to generate machine vision for operating the robotic carton handling system 100.

Further, as described above, calibration of the 3D and/or 2D sensors is essential for sensor data alignment. In this regard, the present disclosure describes a calibration object 302 for sensor data alignment to accurately localize objects for robotic applications. The calibration object 302 may refer to any target object that may be used for calibrating 3D and/or 2D sensors of the robotic carton handling system 100. In an example embodiment, the calibration object 302 may be a custom designed target having unique shape characteristics. For example, as shown in FIG. 3, the calibration object 302 may be an I-shaped object. Further, the calibration object 302 may include one or more markers 304, as shown in FIG. 3. The one or more markers 304 may be any mark, patch, and/or feature on the calibration object 302 that may be easily detected by the 3D and/or 2D sensors. In an embodiment, as shown in FIG. 3, the one or more markers 304 may be one or more black squares on the calibration object 302. The use of a calibration object 302 having an I-shape may also operate to provide a unique shape that improves the localization of the markers 304. That is, the localization of the center of a calibration object 302 having an I-shape may be more accurately determined.

Further, in an embodiment, a single calibration object 302, such as the I-shaped object, may be used for a 3D-2D camera and/or sensor pair. To align all four pairs of 3D-2D cameras and/or sensors of the robotic carton handling system 100, a multi-calibration object setup may be used, such as the multi I-shaped object setup, as shown in FIG. 3, for aligning 3D and/or 2D sensors located on the end effector 136 and/or on the front end of the mobile body 114. Further, during the calibration process, the calibration object 302 may be positioned in front of the robotic carton handling system 100 such that the calibration object may be in the field of view of all 3D and/or 2D cameras of the robotic carton handling system 100. In an embodiment, as shown in FIG. 3, the calibration object 302 may be mounted on the front portion 142 of the robotic carton handling system 100 for better visibility and stability of the calibration object 302.

Figure 4A:
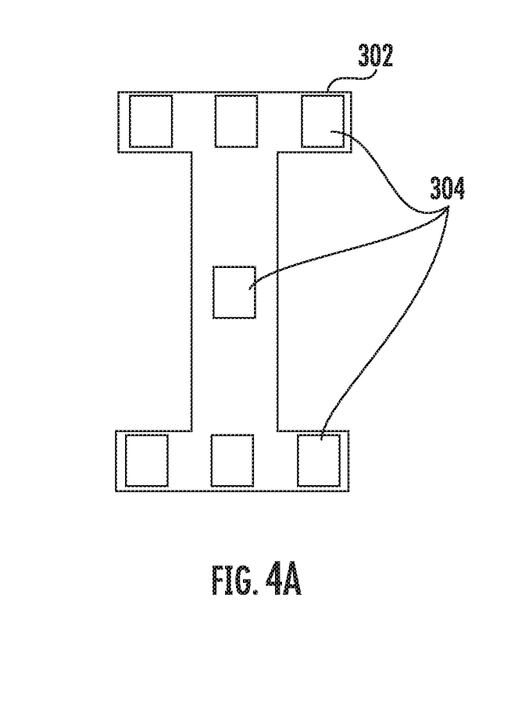
FIG. 4A illustrates a front view of a calibration object in accordance with one or more embodiments of the present disclosure.
Figure 4B:
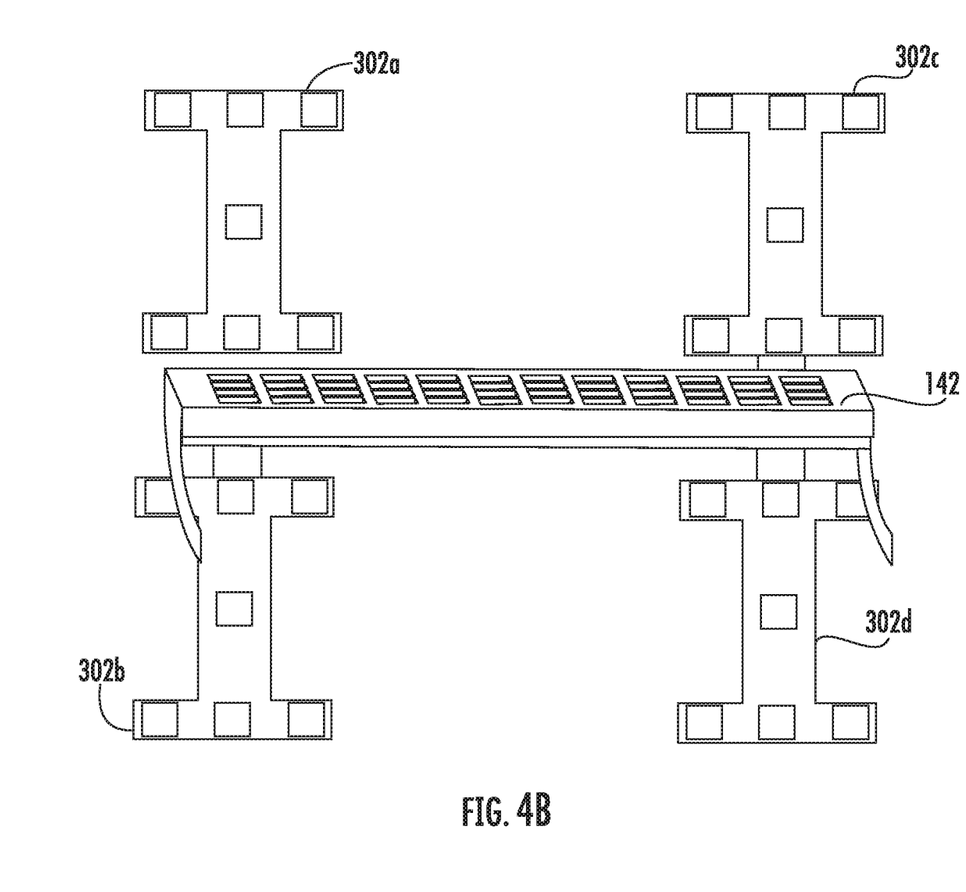
FIG. 4B illustrates a perspective view of the calibration object in accordance with another embodiment of the present disclosure.

FIGS. 4A-4B illustrate a front view of the calibration object 302 in accordance with one or more embodiments of the present disclosure. FIG. 4A illustrates a front view of the calibration object 302, and FIG. 4B illustrates a front view of a setup of multiple calibration objects 302a, 302b, 302c, and 302d, in accordance with one or more embodiments of the present disclosure. As shown in FIG. 4A, the calibration object 302 may be an I-shaped object having distinct shape characteristics. It should be noted that the calibration object 302 is not limited to I-shaped objects, and may include an object of any shape that may be distinctly identified by the 3D and/or 2D sensors of the robotic carton handling system 100.

Further, as described above, the calibration object 302 may include one or more markers 304, as shown in FIG. 4A-4B as black squares. The one or more markers 304 are used to enable the 2D sensor and/or camera to localize the calibration object 302, as will be described hereafter. FIG. 4B illustrates a setup of multiple calibration objects 302a, 302b, 302c, and 302d mounted on the front portion 142 of the robotic carton handling system 100, as described above with reference to FIG. 3. The setup of multiple calibration objects 302a, 302b, 302c, and 302d may be used for aligning 3D and/or 2D sensor pairs located on the end effector 136 (not shown) and/or on the front end of the mobile body 114 (not shown).

Figure 5:
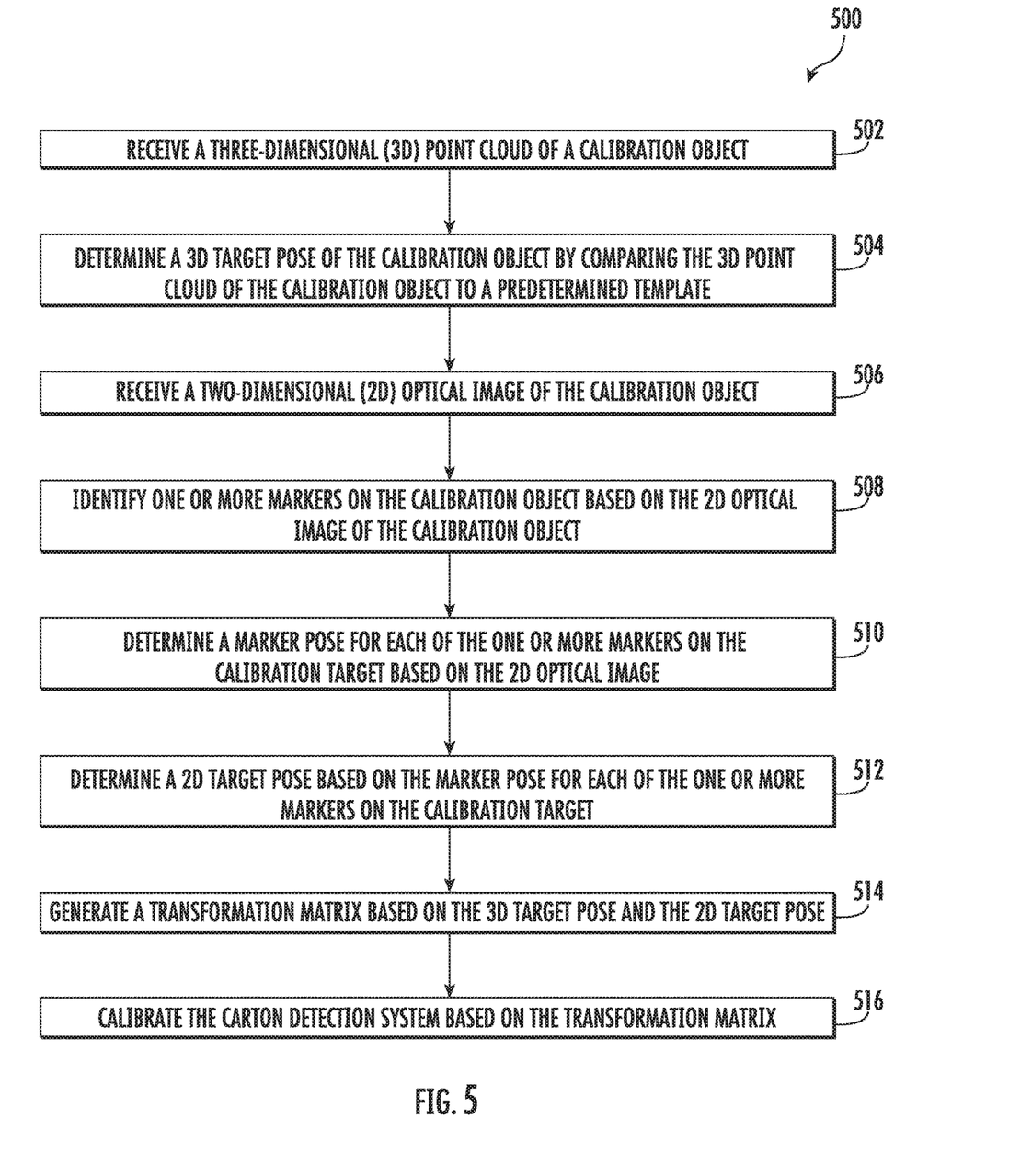
FIG. 5 illustrates an example method for calibrating a carton detection system of the robotic handling system, in accordance with one or more embodiments of the present disclosure.

FIG. 5 illustrates an example method 500 for calibrating the carton detection system 166 of the robotic carton handling system 100, in accordance with one or more embodiments of the present disclosure. The method 500 may include receiving, by the carton detection system 166 and/or the processing subsystem 158 of the robotic carton handling system 100, a three-dimensional (3D) point cloud of a calibration object 302, at block 502. As would be evident to one of ordinary skill in the art in light of the present disclosure, the 3D point cloud may refer to a set of data points in space produced as a result of 3D scanning by a 3D sensor and/or camera. In accordance with the present disclosure, the 3D point cloud may be generated by the front 3D/2D sensor 176 and/or the rear 3D/2D sensors 178, either alone or in combination with the processing subsystem 158. The 3D point cloud of the calibration object 302, as shown in FIG. 4A, may include multiple points in space that may show the I-shaped object.

The method 500 may further include determining, by the carton detection system 166 and/or the processing subsystem 158 of the robotic carton handling system 100, a three-dimensional (3D) target pose of the calibration object 302 by comparing the 3D point cloud of the calibration object 302 to a point cloud template, at block 504. The carton detection system 166, the processing subsystem 158, and/or the robotic carton handling system 100 may include a point cloud template corresponding to the calibration object 302. The point cloud template may be generated when the 3D/2D sensors of the robotic carton handling system 100 are calibrated initially using the calibration object 302, for example, before shipping the machine and/or after setting up the machine at site. The point cloud template may be used later at any time a calibration is required for comparing the point cloud template to a 3D point cloud generated during the calibration process to calculate variance. In an embodiment, the carton detection system 166 and/or the processing subsystem 158 of the robotic carton handling system 100 may use an Iterative Closest Point (ICP) algorithm to calculate 3D target pose. As would be evident to one of ordinary skill in the art in light of the present disclosure, ICP may utilize the point cloud templates described above to match with the 3D point cloud generated by the 3D/2D sensors of the robotic carton handling system 100 to calculate variance. The 3D target pose may include X, Y, Z coordinates, as well as roll angle, pitch angle, and/or yaw angle of the calibration object 302.

The method 500 may further include receiving, by the carton detection system 166 and/or the processing subsystem 158 of the robotic carton handling system 100, a two-dimensional (2D) optical image of the calibration object 302, at block 506. In accordance with the present disclosure, the 2D optical image of the calibration object 302 may be generated by the front 3D/2D sensor 176 and/or the rear 3D/2D sensors 178. Further, the method 500 may include identifying, by the carton detection system 166 and/or the processing subsystem 158 of the robotic carton handling system 100, one or more markers 304 on the calibration object 302 based on the 2D optical image of the calibration object 302, at block 508. In an example embodiment, the 2D optical image generated by the 2D sensor and/or camera of the robotic carton handling system 100 may include an RGB image of the calibration object 302. The one or more markers 304, as described above with reference to FIG. 4A-4B, may include any mark, patch and/or distinct feature on the calibration object 302 which may be identified by the carton detection system 166 and/or the processing subsystem 158 of the robotic carton handling system 100. In an example embodiment, as described above, the one or more markers 304 may include black squares, as shown in FIG. 4A-4B, which may be distinctly visible in the 2D optical image (for example, the RGB image of the calibration object 302). In some embodiments, the carton detection system 166 and/or the processing subsystem 158 may identify the one or more markers 304 on the calibration object 302 by detecting one or more edges and corners of the one or more markers 304 from the 2D optical image. The carton detection system 166 and/or the processing subsystem 158 may, for example, use a Difference of Gaussian (DOG) or a Canny detection algorithm in order to detect edges and corners of the one or more markers 304. Thus, the carton detection system 166 and/or the processing subsystem 158 may identify the one or more markers 304 on the calibration object 302 based on the 2D optical image of the calibration object 302.

The method 500 may further include determining, by the carton detection system 166 and/or the processing subsystem 158 of the robotic carton handling system 100, a marker pose for each of the one or more markers 304 on the calibration object based on the 2D optical image, at block 510. In an example embodiment, the carton detection system 166 and/or the processing subsystem 158 may determine a marker pose (i.e., X, Y, Z coordinates and a roll angle, a pitch angle, and a yaw angle) for each marker 304, based on a marker size and 2D camera focus. Once a marker pose is determined by the carton detection system 166 and/or the processing subsystem 158 for each marker 304 on the calibration object 302, the method 500 may include determining a 2D target pose based on the marker pose for each of the one or more markers 304 on the calibration object 302, at block 512. In some embodiments, the carton detection system 166 and/or the processing subsystem 158 may average the marker pose for all markers 304 to determine the 2D target pose for the calibration object 302. Thus, the carton detection system 166 and/or the processing subsystem 158 determine the 3D target pose and the 2D target pose for the calibration object 302 during the calibration process.

Further, the method 500 may include generating, by the carton detection system 166 and/or the processing subsystem 158, a transformation matrix based on the 3D target pose and the 2D target pose, at block 514. The transformation matrix may be used to show a pose relationship between two frames, for example, a 3D camera frame, a 2D camera frame, and/or a target frame. In accordance with the present disclosure, the transformation matrix may be used to depict a pose relationship between the 3D camera frame and the 2D camera frame such that all the points of 3D point cloud from the 3D camera may be projected on the 2D camera. In an example embodiment, the transformation matrix may be a 4×4 matrix including a rotation submatrix and a translation submatrix. For example, the format for the transformation matrix may be:

$$T = \begin{pmatrix} R11 & R12 & R13 & t\_x \\ R21 & R22 & R23 & t\_y \\ R31 & R32 & R33 & t\_z \\ 0 & 0 & 0 & 1 \end{pmatrix}$$

If the rotation roll, pitch, yaw angles are α, β, γ, then the rotation matrix may be:

$$R = \begin{pmatrix} R11 & R12 & R13 \\ R21 & R22 & R23 \\ R31 & R32 & R33 \end{pmatrix}$$
$$= \begin{pmatrix} \cos\beta\cos\gamma & \sin\alpha\sin\beta\cos\gamma - \cos\alpha\sin\gamma & \cos\alpha\sin\beta\cos\gamma + \sin\alpha\sin\gamma \\ \cos\beta\sin\gamma & \sin\alpha\sin\beta\sin\gamma + \cos\alpha\cos\gamma & \cos\alpha\sin\beta\sin\gamma - \sin\alpha\cos\gamma \\ -\sin\beta & \sin\alpha\cos\beta & \cos\alpha\cos\beta \end{pmatrix}$$

Further, the translation submatrix may be:

$$t = \begin{pmatrix} t\_x \\ t\_y \\ t\_z \end{pmatrix}$$

The translation submatrix may show a translation between two frames, for example, 3D camera frame, 2D camera frame and/or target frame.

In an embodiment, after the 3D sensor and/or camera and the 2D sensor and/or camera detect the calibration object 302, the carton detection system 166 and/or the processing subsystem 158 may generate a 3D_to_target transformation matrix ($T_{3D\_to\_target}$) based on 3D target pose and a 2D_to_target transformation matrix (($T_{2D\_to\_target}$)) based on 2D target pose.

The 3D_to_target transformation matrix $T_{3D\_to\_target}$ may show the rotation and translation from 3D camera frame to target frame. The 2D_to_target transformation matrix $T_{2D\_to\_target}$ may show the rotation and translation from 2D camera frame to target frame.

Further, the carton detection system 166 and/or the processing subsystem 158 may calculate the transformation matrix from 3D camera frame to 2D camera frame, as:

$$T_{3D\_to\_2D} = T_{3D\_to\_target} \times T_{target\_to\_2D} = T_{3D\_to\_target} \times T_{2D\_to\_target}^{-1}$$

($T^{-1}$ means the inverse matrix of the transformation matrix T)

Thus, the transformation matrix from 2D camera frame to 3D camera frame may be the inverse matrix of the transformation matrix from 3D camera frame to 2D camera frame $$T_{2D\_to\_3D} = T_{3D\_to\_2D}^{-1}$$

After generating this transformation matrix, the carton detection system 166 and/or the processing subsystem 158 may project all the points of the 3D point cloud from 3D camera on the 2D camera, based on the below formula:

$$P_{point\_on\_2D} = T_{2D\_to\_3D} * P_{point\_on\_3D}$$

$$P_{point\_on\_2D} = \begin{pmatrix} P_{x\_on\_2D} \\ P_{y\_on\_2D} \\ P_{z\_on\_2D} \\ 1 \end{pmatrix}, P_{x\_on\_2D}, P_{y\_on\_2D}, P_{z\_on\_2D}$$

show the point x, y, z position on 2D camera. $P_{z\_on\_2D}$ is the depth value.

$$P_{point\_on\_3D} = \begin{pmatrix} P_{x\_on\_3D} \\ P_{y\_on\_3D} \\ P_{z\_on\_3D} \\ 1 \end{pmatrix}, P_{x\_on\_3D}, P_{y\_on\_3D}, P_{z\_on\_3D}$$

show the point x, y, z position on 3D camera.

Further, the carton detection system 166 and/or the processing subsystem 158 may use the projection formula, as provided below, to project all 3D points on 2D image for further object detection for the robotic application.

$$Pixel_x = f_x \frac{P_{x\_on\_2D}}{P_{z\_on\_2D}} + c_x$$

$$Pixel_y = f_y \frac{P_{y\_on\_2D}}{P_{z\_on\_2D}} + c_y$$

wherein, $f_x$ and $f_y$ are the focus value of x and y axis for 2D camera; and $C_x$ and $C_y$ are the center value of x and y axis for 2D camera.

With the above formula and known depth value $P_{z\_on\_2D}$ on 2D camera, the carton detection system 166 and/or the processing subsystem 158 may convert a point from the 2D camera to the 3D camera, as:

$$P_{x\_on\_2D} = \frac{(Pixel_x - c_x)}{f_x} \times P_{z\_on\_2D}$$

$$P_{y\_on\_2D} = \frac{(Pixel_y - c_y)}{f_y} \times P_{z\_on\_2D}$$

Then, the 2D point on 3D camera frame may be calculated as $$P_{point\_on\_3D} = T_{3D\_to\_2D} * T_{point\_on\_2D}$$

Thus, the carton detection system 166 and/or the processing subsystem 158 may automatically calibrate the carton detection system 166 based on the transformation matrix, as described above, at block 516.

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A method of calibrating a carton detection system, the method comprising:
 receiving a three-dimensional (3D) point cloud of a calibration object;
 determining a 3D target pose of the calibration object by comparing the 3D point cloud of the calibration object to a point cloud template;
 receiving a two-dimensional (2D) optical image of the calibration object;

identifying one or more markers of the calibration object based on the 2D optical image of the calibration object;
determining a marker pose for each of the one or more markers of the calibration object based on the 2D optical image;
determining a 2D target pose based on the marker pose for each of the one or more markers of the calibration object;
generating a transformation matrix based on the 3D target pose and the 2D target pose; and
calibrating the carton detection system based on the transformation matrix, wherein calibrating the carton detection system comprises projecting one or more points of the 3D point cloud on the 2D optical image based on the transformation matrix.

2. The method of claim 1, wherein identifying the one or more markers of the calibration object comprises detecting one or more edges and corners of the one or more markers from the 2D optical image.

3. The method of claim 1, wherein determining the marker pose for each of the one or more markers comprises estimating the marker pose based on at least one of a camera focus and marker size.

4. The method of claim 1, wherein determining the 2D target pose based on the marker pose further comprises determining a marker location for each of the one or more markers.

5. The method of claim 1, wherein generating the transformation matrix further comprises:
generating a 3D_to_target transformation matrix based on the 3D target pose;
generating a 2D_to_target transformation matrix based on the 2D target pose; and
generating the transformation matrix based on the 3D_to__target transformation matrix and the 2D_to_target transformation matrix.

6. The method of claim 1, wherein generating the transformation matrix comprises generating a rotation submatrix and a translation submatrix.

7. The method of claim 6, further comprising generating the rotation submatrix based on one or more of a roll angle, a pitch angle, or a yaw angle.

8. The method of claim 6, further comprising generating the translation submatrix based on a translation between one or more of the 3D point cloud, the 2D optical image, and the point cloud template.

9. A robotic carton handling system for unloading cartons, the robotic carton handling system comprising:
a mobile body;
a movable robotic manipulator attached to the mobile body, wherein the movable robotic manipulator comprises an end effector configured to unload one or more cartons from a carton pile; and
a carton detection system comprising:
one or more sensors coupled to at least one of the mobile body or the movable robotic manipulator, wherein the one or more sensors are configured to provide a two-dimensional (2D) optical image and a three-dimensional (3D) point cloud of a calibration object; and
a processing subsystem in communication with the one or more sensors, wherein the processing subsystem is configured to:
receive the 3D point cloud of the calibration object from the one or more sensors;
determine a 3D target pose of the calibration object by comparing the 3D point cloud of the calibration object to a point cloud template;
receive the 2D optical image of the calibration object;
identify one or more markers of the calibration object based on the 2D optical image of the calibration object;
determine a marker pose for each of the one or more markers of the calibration object based on the 2D optical image;
determine a 2D target pose based on the marker pose for each of the one or more markers of the calibration object;
generate a transformation matrix based on the 3D target pose and the 2D target pose;
calibrate the carton detection system based on the transformation matrix; and
project one or more points of the 3D point cloud on the 2D optical image based on the transformation matrix.

10. The robotic carton handling system of claim 9, wherein the one or more sensors generate the 2D optical image and the 3D point cloud of an I-shaped target defining one or more markers.

11. The robotic carton handling system of claim 9, wherein the one or more sensors further configured to generate data related to a shape of the calibration object.

12. The robotic carton handling system of claim 9, wherein the processing subsystem is further configured to detect one or more edges and corners of the one or more markers from the 2D optical image.

13. The robotic carton handling system of claim 9, wherein the processing subsystem is further configured to estimate the marker pose based on at least one of a camera focus and a marker size.

14. The robotic carton handling system of claim 9, wherein the processing subsystem, in generating the transformation matrix, is further configured to generate a rotation submatrix and a translation submatrix.

15. The robotic carton handling system of claim 9, wherein the processing subsystem is further configured to:
generate a 3D_to_target transformation matrix based on the 3D target pose;
generate a 2D_to_target transformation matrix based on the 2D target pose; and
generate the transformation matrix based on the 3D_to_ target transformation matrix and the 2D_to_target transformation matrix.

16. A material handling system comprising:
a robotic carton handling system for unloading cartons in a carton pile, the robotic carton handling system, the robotic carton handling system comprising:
a mobile body;
a movable robotic manipulator attached to the mobile body, wherein the movable robotic manipulator comprises an end effector configured to unload one or more cartons from the carton pile;
a calibration object; and
a carton detection system comprising:
one or more sensors coupled to at least one of the mobile body or the movable robotic manipulator and configured to generate a two-dimensional (2D) optical image and a three-dimensional (3D) point cloud of the calibration object; and
a processing subsystem in communication with the one or more sensors, the processing subsystem configured to:
receive the 3D point cloud of the calibration object from the one or more sensors;
determine a 3D target pose of the calibration object by comparing the 3D point cloud of the calibration object to a point cloud template;
receive the 2D optical image of the calibration object;

identify one or more markers on the calibration object based on the 2D optical image of the calibration object;

determine a marker pose for each of the one or more markers on the calibration object based on the 2D optical image;

determine a 2D target pose based on the marker pose for each of the one or more markers on the calibration object;

generate a transformation matrix based on the 3D target pose and the 2D target pose;

calibrate the carton detection system based on the transformation matrix; and project one or more points of the 3D point cloud on the 2D optical image based on the transformation matrix.

17. The material handling system of claim 16, wherein the calibration object comprises an I-shaped target defining one or more markers.

18. The material handling system of claim 16, wherein the one or more sensors is further configured to generate data related to a shape of the calibration object.

* * * * *